United States Patent
Ono

(10) Patent No.: US 8,149,472 B2
(45) Date of Patent: Apr. 3, 2012

(54) IMAGE-SCANNING SYSTEM, METHOD OF CONTROLLING IMAGE-SCANNING SYSTEM, AND COMPUTER READABLE MEDIUM THEREFOR

(75) Inventor: Atsuko Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1166 days.

(21) Appl. No.: 11/877,948

(22) Filed: Oct. 24, 2007

(65) Prior Publication Data

US 2008/0137156 A1 Jun. 12, 2008

(30) Foreign Application Priority Data

Dec. 11, 2006 (JP) ................................. 2006-332811

(51) Int. Cl.
*H04N 1/04* (2006.01)
*H04N 1/32* (2006.01)
(52) U.S. Cl. ........ 358/474; 358/486; 358/442; 358/468; 358/448; 358/449; 358/451
(58) Field of Classification Search .................. 358/474, 358/486, 468, 497, 404, 444, 442, 1.15, 1.16, 358/448, 449, 451; 250/208.1, 234–236, 250/216; 382/312, 318, 319
See application file for complete search history.

(56) References Cited

U.S. PATENT DOCUMENTS

| | | | |
|---|---|---|---|
| 6,316,761 B1 * | 11/2001 | Yamaguchi | 250/208.1 |
| 2002/0145765 A1 | 10/2002 | Chou | |
| 2006/0044601 A1 * | 3/2006 | Misawa et al. | 358/1.15 |

FOREIGN PATENT DOCUMENTS

| | | | |
|---|---|---|---|
| CN | 1393798 A | | 1/2003 |
| JP | 6-52276 U | | 7/1994 |
| JP | 11-017930 A | | 1/1999 |
| JP | 2000-244697 A | | 9/2000 |
| JP | 2002-077526 A | | 3/2002 |
| JP | 2004-040489 A | | 2/2004 |
| JP | 2004040489 A | * | 2/2004 |
| JP | 2004-187214 A | | 7/2004 |
| JP | 2006-180355 A | | 7/2006 |
| JP | 2006180355 A | * | 7/2006 |

* cited by examiner

*Primary Examiner* — Cheukfan Lee

(74) *Attorney, Agent, or Firm* — Canon USA, Inc. I.P. Division

(57) ABSTRACT

An image-processing system and a method for controlling the same, including an image-scanning device obtaining image data by scanning data written on a document, an image-processing device processing the image-data item and outputting as an output-image data, and a user interface including setting conditions of the scanning and the image processing, setting an item having a limit value, so as to determine whether or not, at least one of (1) the size of the processed image data, and (2) a time period from when the scanning processing is started to the output, should be limited based on an input from the user interface, changing at least one of the conditions based on the item, performing scanning for the document based on the conditions and the changed condition, and processing image data obtained through the scanning based on the conditions and the changed condition, and outputting the output-image data.

12 Claims, 8 Drawing Sheets

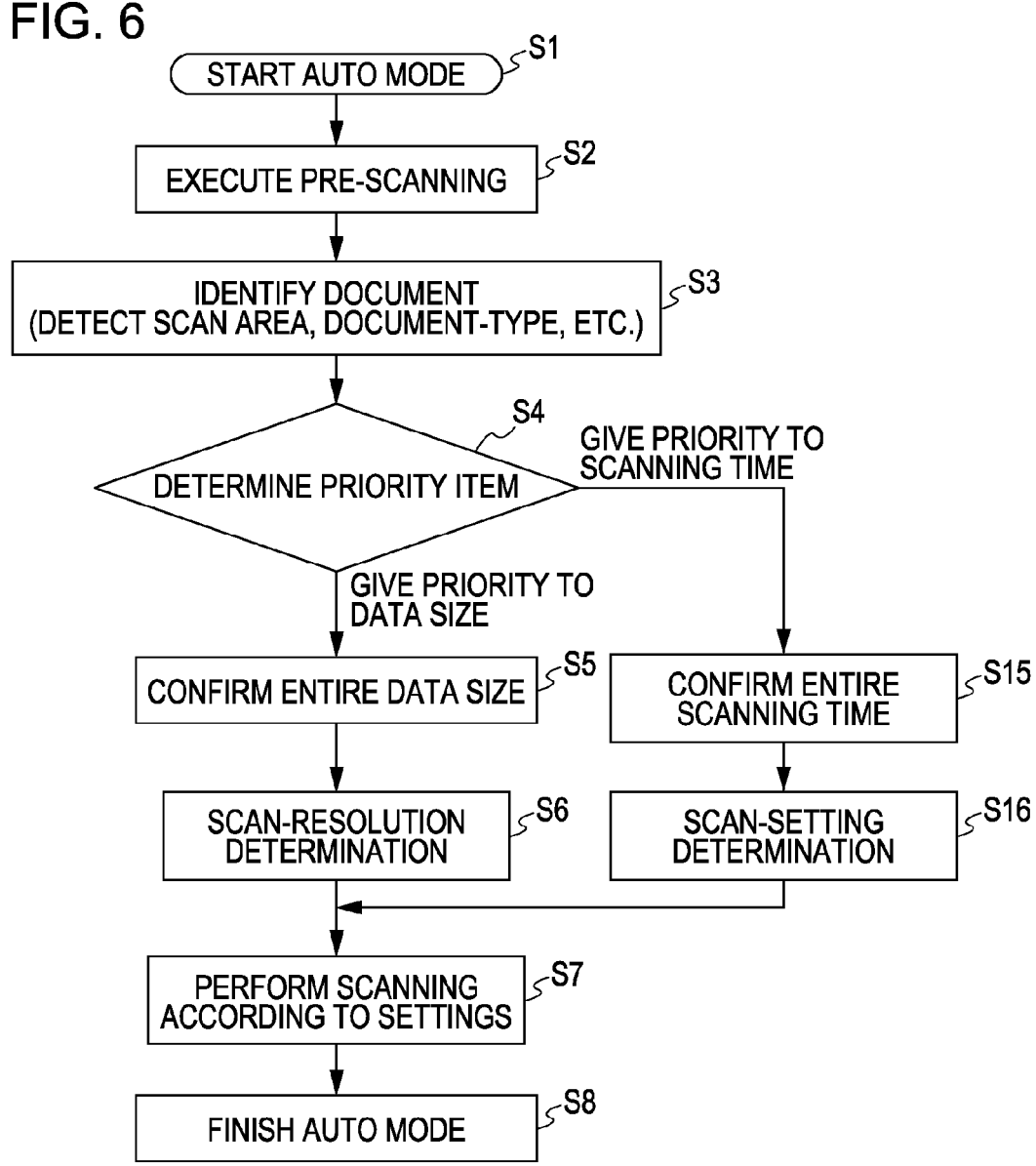

FIG. 7

DETERMINE ENTIRE DATA SIZE

ENTIRE DATA SIZE     [ 650 MB    [▽] ]

[ OK ]   [ CANCELLATION ]

FIG. 8

SPECIFY RESOLUTION

◎ EVERY 10 dpi
○ EVERY 100 dpi
○ USE BASIC RESOLUTION (75, 150, 300, 600 dpi)

[ OK ]   [ CANCELLATION ]

FIG. 9

SETTINGS TO WHICH PRIORITY
IS GIVEN AT CALCULATION TIME

○ STORE DATA ON RELATIONSHIP
 BETWEEN CROP SIZES
◎ ADD DATA CAPACITIES OF CROPS

[ OK ]  [ CANCELLATION ]

FIG. 10

SETTINGS TO WHICH PRIORITY
IS GIVEN AT CALCULATION TIME

MAXIMUM DATA SIZE OF 1 CROP   [ 100 MB   [▽] ]

[ OK ]  [ CANCELLATION ]

FIG. 11

SETTINGS TO WHICH PRIORITY IS GIVEN
AT SCAN-RESOLUTION-SETTING TIME

◎ HIGH-IMAGE-QUALITY MODE
○ HIGH-SPEED MODE

[ OK ]  [ CANCELLATION ]

FIG. 12

SPECIFY ENTIRE SCANNING TIME

SCANNING-FINISH TIME [ WITHIN THREE MINUTES [▽]]

[ ADVANCED SETTINGS ]   [ OK ]   [ CANCELLATION ]

FIG. 13

AUTO-MODE-ADVANCED SETTINGS

PRIORITY-SETTING ITEM

SET IMAGE QUALITY OF REFLECTION DOCUMENT :
■ MOIRÉ REDUCTION
☐ FADING CORRECTION
■ TRASH-FLAW REDUCTION
☐ BACKLIGHT CORRECTION

SET IMAGE QUALITY OF FILM :
☐ FADING CORRECTION
■ TRASH-FLAW REDUCTION
■ BACKLIGHT CORRECTION

[ OK ]   [ CANCELLATION ]

FIG. 14

DATA-CAPACITY-ADJUSTMENT METHOD

○ RESOLUTION
◎ COMPRESSION RATE AT FILE-STORING TIME

[ OK ]   [ CANCELLATION ]

IMAGE-SCANNING SYSTEM, METHOD OF CONTROLLING IMAGE-SCANNING SYSTEM, AND COMPUTER READABLE MEDIUM THEREFOR

BACKGROUND OF THE INVENTION

1. Field of the Invention

The present invention relates to a method of controlling an image-scanning system and particularly relates to control performed when a user sets a scan condition at the image-scanning time and/or makes settings on image processing performed after the image scanning.

2. Description of the Related Art

Known apparatuses and/or devices including an image scanner such as a flat-bed scanner, a film scanner, a multi-function peripheral, a copier, etc. include a color-correction unit provided to perform unsharp mask, automatic color adjustment, fading correction, backlight correction, etc., as parameters used to perform image processing. Further, the known apparatuses and/or devices include a function of cropping out a preview image, for example, so as to specify an area for scanning.

Further, since the known apparatuses and/or devices have an auto-mode function or the like, so as to automatically determine the type and/or position of a document from image data obtained through pre-scanning, a user can obtain scanned-image data without making detailed specifications.

Further, according to a system disclosed in Japanese Patent Laid-Open No. 2000-244697, for example, a user selects either image-quality-priority mode or speed-priority mode when a computer performs image processing automatically.

Factors considered important for scanning data by the user includes the image-data size and/or the scanning time other than the image quality. It is difficult to set the data size and/or the scanning time, as desired by the user. It is also difficult to achieve both the data size and the scanning time.

When the width, height, and resolution of a desired area are determined, the data size corresponding to the desired area is determined in most cases. On the other hand, the entire data size is important when scanning data written on a plurality of documents, so as to record the data onto media including a compact disk (CD)-recordable (R) or the like and/or upload the data to a Web album. In that case, it is difficult for the user to set the width, the height, and the resolution according to a target data size by performing ordinary operations.

On the other hand, in the case where convenient auto mode is selected, it takes much time to perform document-determination processing, image processing, etc., and it is difficult to know the time required to finish scanning (scanning time). Further, at the network-scanning time, the time required to transfer data becomes an unstable factor and a bottleneck, which makes it difficult to make settings with consideration given to latency of the user.

SUMMARY OF THE INVENTION

The present invention provides an image-input device that can determine a processing load considered appropriate by the user within the limits of parameters during scanning performed based on user settings and/or scanning performed in the auto mode.

A method of controlling an image-processing system including an image-scanning device configured to obtain an image-data item by scanning data written on a document, an image-processing device configured to perform image processing for the image-data item and output as an output-image data, and a user interface constitutes some of the various embodiments of the present invention.

The control method includes setting a condition for performing the scanning processing and a condition for performing the image processing, setting an item having a limit value, so as to determine whether or not, at least one of (1) the size of the image-data item subjected to the image processing, and (2) the time period from when the scanning processing is started to when the output-image data is output should be limited based on an input from the user interface, changing at least one of the scanning-processing condition and the image-processing condition based on the item having the limit value, performing the scanning processing for the document by using the image-scanning device based on the scanning-processing condition and the changed condition, and performing image processing for image data obtained through the scanning processing based on the image-processing condition and the changed condition, and outputting the output-image data.

Further features and aspects of the present invention will become apparent from the following description of exemplary embodiments with reference to the attached drawings.

BRIEF DESCRIPTION OF THE DRAWINGS

FIG. 5 shows an example dialogue performed for setting an item having a limit value at the auto-mode-scanning time according to the embodiment.

FIG. 6 is a flowchart showing example operations performed when auto mode is selected.

FIG. 7 is an example dialogue performed when a user specifies the entire data size.

FIG. 8 shows a resolution-specification dialogue.

FIG. 9 shows a dialogue performed to determine an item to which priority is given at the calculation time.

FIG. 10 shows a dialogue performed to specify the maximum size of data corresponding to a single crop.

FIG. 11 shows a setting dialogue performed to set an item to which priority is given at the scan-resolution-setting time.

FIG. 12 shows an entire-scanning-time-specification dialogue according to the embodiment.

FIG. 13 shows an example advanced-setting dialogue according to the embodiment.

FIG. 14 shows an example dialogue performed to specify a data-capacity-adjustment method.

DESCRIPTION OF THE EMBODIMENTS

Exemplary Embodiments

Figure 1:
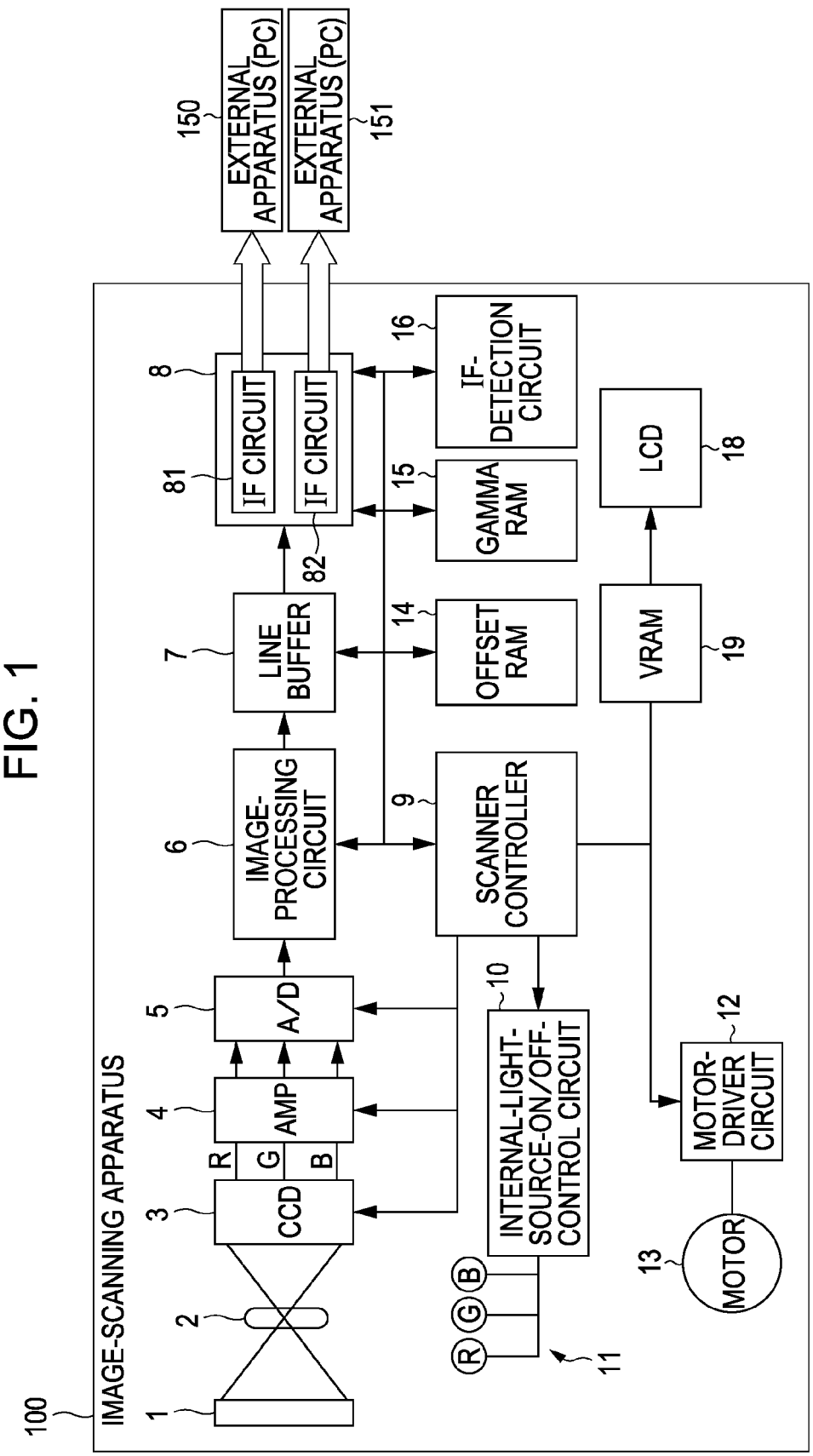
FIG. 1 is a block diagram illustrating an example configuration of an image-scanning apparatus according to an embodiment of the present invention and image processing apparatuses.

FIG. 1 is a block diagram illustrating an example configuration of an image-scanning apparatus 100 according to a first embodiment of the present invention and image processing apparatuses 150 and 151.

The image-scanning apparatus 100 includes an optical-image-forming lens 2, a charge-coupled-device (CCD) line sensor 3, an analog-gain adjuster 4, an analog-to-digital (A/D) converter 5, an image-processing circuit 6, a line buffer 7, an interface-circuit group 8, and a scanner controller 9. The image-scanning apparatus 100 further includes an internal-light-source-ON/OFF-control circuit 10, an internal light source 11, a motor-driver circuit 12, a pulse motor 13, an offset random-access memory (RAM) 14, a gamma RAM 15, an interface (IF)-detection circuit 16, a liquid-crystal display (LCD) 18, and a video RAM (VRAM) 19.

Light reflected from a document 1 illuminated by the internal light source 11 passes through the optical-image-forming lens 2 and forms an image on the CCD-line sensor 3 which is a photo-detector group. The CCD-line sensor 3 has an electronic-shutter function provided to prevent the exposure amount from being saturated. The analog-gain adjuster 4 variably amplifies an analog-image signal transmitted from the CCD-line sensor 3. The A/D converter 5 converts the analog-image signal transmitted from the analog-gain adjuster 4 into a digital-image signal.

The image-processing circuit 6 subjects the digital-image signal to image processing including offset correction, shading correction, digital-gain adjustment, color-balance adjustment, masking, resolution conversion performed in a main-scanning direction and/or a sub-scanning direction, etc. The line buffer 7 is configured to store image data temporarily and achieved, as a general-purpose RAM.

The interface-circuit group 8 includes an interface circuit 81 and an interface circuit 82. The interface circuit 81 communicates with the image processing apparatus 150 and the interface circuit 82 communicates with the image processing apparatus 151. Each of the image processing apparatuses 151 and 152 is a host computer connected to a user interface including a keyboard, a mouse, a display, etc. (not shown). The interface circuit 81 supports USB 2.0 and the interface circuit 82 is provided, as a local-area network (LAN). Further, the interface-circuit group 8 is connected to the IF-detection circuit 16. The IF-detection circuit 16 detects the type and communication speed of each of the interfaces connected to the interface circuits 81 and 82.

The scanner controller 9 controls a scanner according to an instruction issued from the image processing apparatus 150. The scanner controller 9 further controls the motor-driver circuit 12, the internal-light-source-ON/OFF-control circuit 10, the image-processing circuit 6, etc.

The internal-light-source-ON/OFF-control circuit 10 controls the turning on/off of the internal-light source 11. Here, a complementary metal oxide semiconductor (CMOS) or the like may be used in place of the CCD-line sensor 3, as the photo detector.

Further, an interface including a small computer system interface (SCSI), a parallel interface, IEEE 1394, a local area wireless network (LAWN), Bluetooth (Registered Trademark), etc. may be used.

The motor-driver circuit 12 is configured to drive the pulse motor 13. The offset RAM 14 is used, as a working area used to perform image processing. The offset RAM 14 is used to correct the value of offset between three RGB lines of the CCD line sensor 3. Further, the offset RAM 14 temporarily stores various data including data obtained through the shading correction or the like.

The gamma RAM 15 stores data on a gamma curve and performs gamma correction. The LCD 18 is configured to display an image on an operation unit of the image-scanning apparatus 100.

Figure 2:
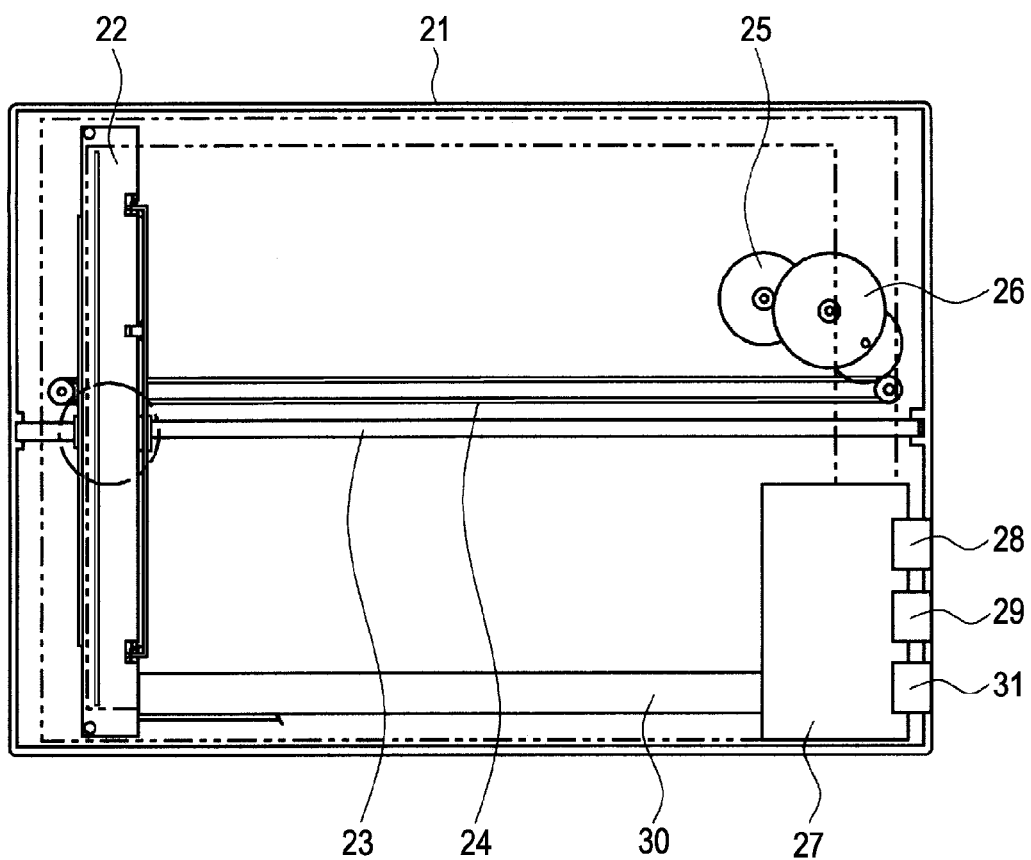
FIG. 2 is a sectional view of the image-scanning apparatus.

FIG. 2 is a sectional view of the image-scanning apparatus 100. The image-scanning apparatus 100 includes a frame 21, a sensor unit 22, a reference axis 23, an operation belt 24, a stepping motor 25, a gear group 26, a substrate 27, and a USB connector 28. The image-scanning apparatus 100 further includes a LAN connector 29, a flat cable 30, and a connector 31. The flat cable 30 connects the sensor unit 22 to the substrate 27. The connector 31 is used to establish connection with an AC adapter which is an external power source.

Figure 3:
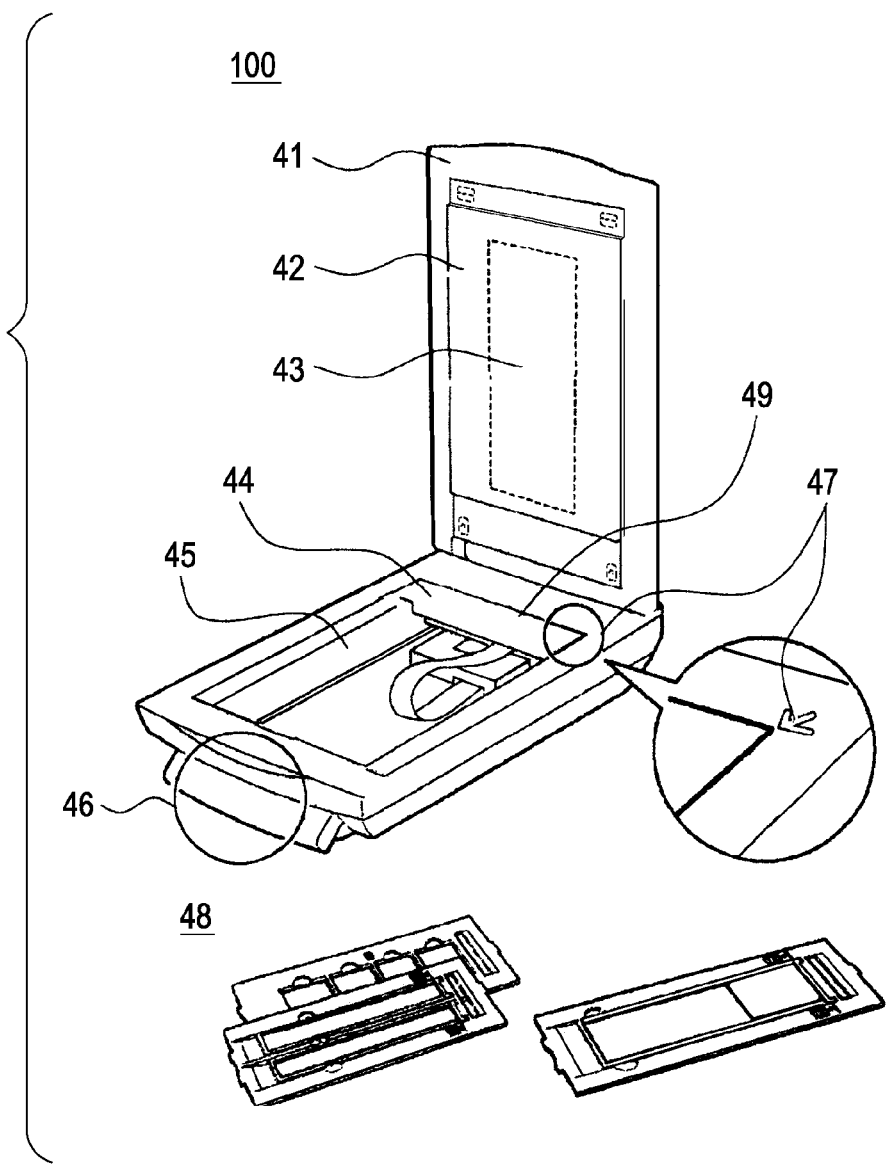
FIG. 3 is an external view of the image-scanning apparatus.

FIG. 3 is an external view of the image-scanning apparatus 100. The image-scanning apparatus 100 includes a document-table cover 41, a protection seat 42, a film-scan-light-source unit 43, a document-scan unit 44, a document-table-glass part 45, and a scan button 46. The image-scanning apparatus 100 further includes a document-registration mark 47, a film guide 48, and a calibration area 49. The calibration area 49 is used to read a black mark and a white mark that are provided on the back of the document-table-glass part 45. The term "calibration" denotes processing performed to generate black-shading data and white-shading data showing the standard of shade, so as to recognize colors correctly.

Figure 4:
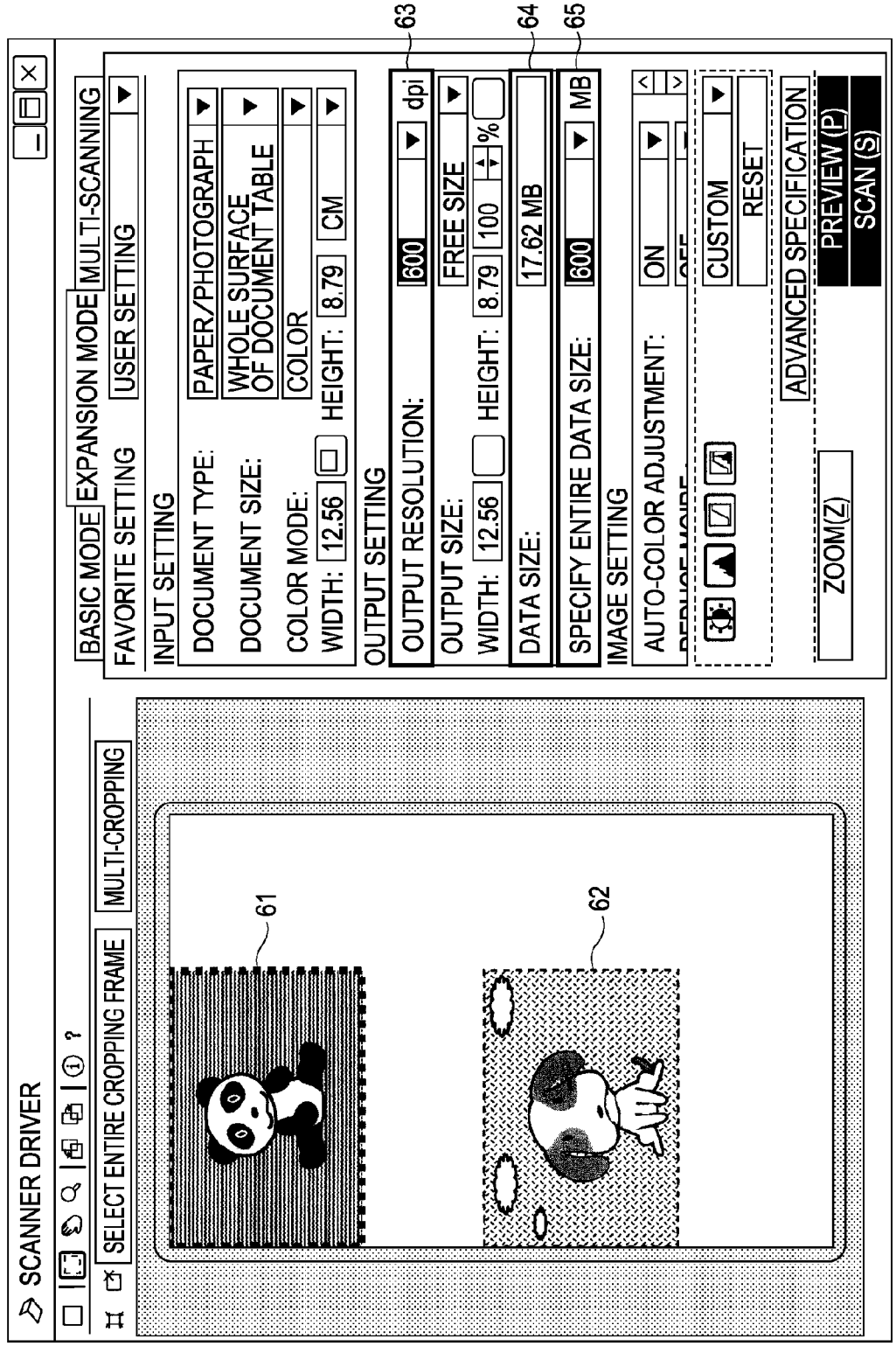
FIG. 4 shows an example user interface (UI) of driver software according to the embodiment.

FIG. 4 shows an example display image of user interface of driver software that is executed by a host computer or the image processing apparatus 150 shown in FIG. 1 and that is configured to control the image-scanning apparatus 100. An area 64 showing the size of data on a scanned image according to the size of a crop frame 61 and/or a crop frame 62 generated on the preview area corresponding to the left part of FIG. 4 and showing previously read images and the resolution determined in an output-resolution area 63 is provided. The area 64 shows the size of data shown in the crop frame 61 which is the currently used focus crop. The frame of the focus crop is thicker than those of other crops.

An area 65 used to specify the entire data size is provided so that a user can specify an arbitrary data size. For example, when two crops of the same size, such as the crop frames 61 and 62 are generated and the entire data size thereof is determined to be 20 MB, the resolution is determined and scanning is performed within a range where the data capacity of each of the crops is 10 MB or less. When data on the entire data size is not input to the specification area 65, it is determined that the user makes no specifications and normal processing is performed.

Further, after data on the data size is input to the entire-data-size-specification area 65, the resolution is automatically calculated, and data shown in the output-resolution-display area is changed. Subsequently, the resolution is clearly displayed for the user. According to another embodiment of the present invention, operations are performed by the image-scanning apparatus 100 in auto mode, where the image-scanning apparatus 100 is shown in FIGS. 1 to 3. Since a document-recognition method including scan-area (main-scan area) detection, document-type detection, etc. performed in the auto mode is known, the description of the document-recognition method is omitted.

FIG. 5 shows an example dialogue performed to determine settings limited at the auto-mode-scanning time. The user can select either restricting the data size or restricting the scanning time. The above-described settings are made before making the auto mode effective.

FIG. 6 is a flowchart illustrating the operations performed in the auto mode. When the auto mode is started, at step S1, pre-scanning (preceding scanning) is performed, at step S2. After the pre-scanning is performed, a document is recognized, and a scan area is detected so that an area for scanning performed through main reading is determined at step S3. Further, the document type is detected so that image processing and a resolution that are appropriate for the document are determined. After that, when an item having a limit value is determined, at step S4, processing is divided according to the settings shown in FIG. 5. Namely, the processing is divided according to whether the data size is limited or the scanning time is limited. If the data size is limited, the user confirms in what size the entire data size should fall, at step S5.

FIG. 7 shows an example dialogue performed when the user confirms the entire data size, at step S5. In FIG. 7, the entire data size is shown, as 650 MB, by default. However, the user can set a specified value, as the entire data size. The entire data size can be set effectively in either of the case where a single document is detected and the case where a plurality of documents is detected. Scan-resolution-determination processing is performed, at step S6, so that the amount of data for scanning is equivalent to the entire data size or less. Next, at step S7, scanning is performed according to the settings, and then in step S8, auto mode is finished.

Several methods can be used, as options provided to perform the resolution-determination processing corresponding to step S6.

FIG. 8 shows a resolution-step-width-specification dialogue. According to the first method, the step width of a determined resolution is specified by performing the resolution-step-width-specification dialogue shown in FIG. 8. According to the resolution-step-width-specification dialogue, a comprehensible resolution including a resolution of 10 dpi, a resolution of 100 dpi, etc. can be determined, which makes it possible to reduce a time required to convert the resolution. Further, according to the resolution-step-width-specification dialogue shown in FIG. 8, it becomes possible to instruct to use the comprehensible resolution in the main-scanning direction corresponding to the resolution of a sensor. Subsequently, the time required to convert the resolution can be reduced. Here, a resolution of 600 dpi is used, as the basic resolution of the CCD-line sensor 3, and one-$2^n$-th of the basic resolution can be specified.

FIG. 9 shows a dialogue specifying settings to which priority is given at the calculation time. According to the second method, settings to which priority is given at the calculation time are specified through the dialogue shown in FIG. 9. Settings made to store data on the relationship between the crop sizes allow for scanning data written on a plurality of documents in the same resolution. According to the above-described configurations, data on the document size is stored and scanning is performed in the same resolution. Subsequently, data written on the area corresponding to the most of the detected plurality of documents can be scanned at one time.

On the contrary, when settings made to add the data capacities of the crops to each other are selected, the capacities of the crops can be added to each other even though documents of different sizes such as documents of the 2L size (127×178 mm), the L size (89×127 mm), etc. are placed. In that case, a method of scanning data in the resolutions corresponding to the crops, a method of scanning data on one of crops in the maximum resolution and converting the resolution of data on other crops, and a method of scanning one of the crops in the minimum resolution and converting the resolution of data on other crops can be used.

FIG. 10 shows a dialogue performed to specify the maximum size of data corresponding to a single crop. According to the third method, the maximum size of the data corresponding to a single crop is specified through the dialogue shown in FIG. 10. According the third method, the maximum size of the data corresponding to the single crop is determined so that the size of a single image is limited, which is effective at easily using data on a scanned image.

FIG. 11 shows a dialogue performed to make settings to which priority is given at the scan-resolution-setting time. The fourth method allows for selecting settings to which priority is given at the scan-resolution-setting time by performing the dialogue shown in FIG. 11. Namely, if high-image-quality mode is set when a resolution on which data is eventually stored is different from the sensor-basic resolutions shown in FIG. 8 and/or one-$2^n$-th of the basic resolutions, scanning is performed in a resolution higher than an ultimately required resolution and the resolution conversion is performed. Further, if high-speed mode is set when the resolution on which data is eventually stored is different from the sensor-basic resolution, scanning is performed in a resolution lower than the ultimately required resolution and the resolution conversion is performed. The resolution used according to the fourth method is selected from between the basic resolution and the resolution corresponding to one-$2^n$-th of the basic resolution.

FIG. 12 shows an entire-scanning-time-specification dialogue. When the user limits the scanning time, at step S4, the processing advances to step S15 so that the entire scanning time is confirmed. Here, after confirming settings on the time required to finish scanning, where the scanning time is specified through the entire-scanning-time-specification dialogue, the processing moves to step S16 where scan-setting-determination processing is performed. Next, at step S7, scanning is performed according to the settings, and then in step S8, auto mode is finished.

Advanced settings can be made for the entire-scanning-specification dialogue shown in FIG. 12. Subsequently, it becomes possible to determine what image processing should be provided with priority when the scanning time is reduced.

FIG. 13 shows an advanced-setting dialogue performed to set details on auto-mode image processing in advance. Here, if the scanning time should be reduced, image processing for which no priority settings are made is omitted with priority. When data written on a film document is scanned and the scanning time should be reduced according to settings shown in FIG. 13, fading correction is omitted.

After the entire-scanning time is set and the scanning is started, it is often likely that the actual scanning time is longer than expected according to the status of the network and/or the external apparatuses to which the image data is transmitted.

According to another embodiment of the present invention, if the actual scanning time seems to be longer than expected after the entire-scanning time is set and the scanning is started, a dialogue is displayed so that the user can determine whether or not the resolution and the size of image data for scanning should be decreased, and the data should be transmitted during the progress of the scanning.

If the user determines to decrease the resolution, the resolution of the image data for scanning is converted so that the resolution of the image data is maximized within the bounds of being able to transmit the image data in the remaining time, and the image data is transmitted. Further, it becomes possible to select either settings made to cancel the scanning or settings made to continue the scanning even though long time is required.

According to the above-described embodiments, the entire size of the image data is adjusted according to the resolution. Here, the scanning is performed while giving priorities to the resolution set by the user and/or the resolution determined according to the document type determined in the auto mode. Finally, the image data is compressed when the image data is stored, as file data, so that the size of the entire data is equivalent to the entire data size desired by the user or less.

FIG. 14 shows an example dialogue performed to specify a data-capacity-adjustment method. According to the example dialogue shown in FIG. 14, it is exclusively determined whether the data capacity should be adjusted according to the resolution or the ratio of compression performed at the file-storage time. The capacity of image data changes due to the compression according to details on the image data. Therefore, average compression is performed according to what percent of the image data should be reduced, that is, the reduction rate. If the capacity of the compressed data is larger than that of the entire data desired by the user, a retry is made so that the image data is further compressed at a higher rate.

According to the above-described embodiments, parameters on which the user places importance are selected at the time where the scanning is performed according to settings made by the user and/or the auto-mode scanning is performed. Therefore, it becomes possible to determine a processing load considered appropriate by the user within the limits of the parameters.

Further, according to the above-described embodiments, measures taken against condition variations caused by an unstable factor are specifically proposed, which makes it easier for the user to operate the image-scanning apparatus 100 without being confused.

Further, according to the above-described embodiments, an image-scanning system including the image-scanning apparatus 100, and the image processing apparatuses 150 and 151 is configured, as shown in FIG. 1. However, the image-scanning system may be a multi-function peripheral and/or a copier provided, as a housing accommodating the image-scanning apparatus 100, and the image processing apparatuses 150 and 151. In addition, a computer readable medium may contain computer-executable instructions for performing a program for controlling an image processing system including an image-scanning device configured to obtain an image-data item by scanning data written on a document, an image-processing device configured to perform image processing for the image-data item and output as an output-image data, and a user interface.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-332811 filed on Dec. 11, 2006, which is hereby incorporated by reference herein in its entirety.

What is claimed is:

1. A control method of controlling an image-processing system including an image-scanning device configured to perform scanning processing by scanning an image on a document to obtain a scanned image-data, an image-processing device configured to perform image processing for the scanned image-data and output as an output-image data, and a user interface, the control method comprising:
   setting a condition for performing the scanning processing and a condition for performing the image processing;
   selecting a restricting item with the user interface, wherein the restricting item is one of (1) a size of the output-image data subjected to the image processing, and (2) a time period from when the scanning processing is started to when the output-image data is output;
   changing at least one of the scanning-processing condition and the image-processing condition based on the restricting item having a limit value;
   performing the scanning processing for the document to obtain the scanned image-data by using the image-scanning device based on the scanning-processing condition, and the changed condition; and
   performing image processing for the scanned image-data based on the image-processing condition and the changed condition, and outputting the output-image data,
   wherein changing at least one of the scanning-processing condition and the image-processing condition includes performing an advanced-condition setting to set an advanced item corresponding to the restricting item.

2. The control method according to claim 1, wherein setting a condition includes performing scan-range setting to pre-scan data written on the document and setting a scan range of the document from image data obtained through the pre-scan.

3. The control method according to claim 1, wherein, when the restricting item denotes (1) the size of the output-image data subjected to the image processing, performing an advanced-condition setting includes setting a data size.

4. The control method according to claim 3, wherein a setting method used to set a resolution of the output-image data subjected to the image processing based on the data size is set.

5. The control method according to claim 4, wherein another setting method is set, where the setting method is used to set a resolution of each of a plurality of the output-image data subjected to the image processing in a case where a plurality of the documents is provided.

6. The control method according to claim 1, wherein, when the restricting item denotes (2) the time period, performing an advanced-condition setting includes setting a time limit.

7. The control method according to claim 6, further comprising:
   determining which of a resolution and the image processing should be restricted.

8. The control method according to claim 6, wherein, in a case where the time period is calculated based on the set advanced item and the calculated time period exceeds the time limit, a warning is displayed.

9. The control method according to claim 8, wherein the advanced item is set again based on input from the user interface.

10. The control method according to claim 1,
    wherein setting a condition includes setting a preset condition that is preset in accordance with a type of the document, and
    wherein changing the image-processing condition includes changing the image-processing condition as the preset condition, whether or not each of a plurality of image processing is to be executed, and displaying the changing on the user interface, whereby it is possible to change the image-processing condition whether or not each of the plurality of image processing is to be executed.

11. A non-transitory computer readable medium containing computer-executable instructions for performing a program for controlling an image-processing system including an image-scanning device configured to perform scanning processing by scanning an image on a document to obtain a scanned image-data, an image-processing device configured to perform image processing for the scanned image-data and output as an output-image data, and a user interface, the non-transitory computer readable medium comprising:
   computer-executable instructions for setting a condition for performing the scanning processing and a condition for performing the image processing;
   computer-executable instructions for selecting a restricting item with the user interface, wherein the restricting item is one of (1) a size of the output-image data subjected to the image processing, and (2) a time period from when the scanning processing is started to when the output-image data is output;

computer-executable instructions for changing at least one of the scanning-processing condition and the image-processing condition based on the restricting item having a limit value;

computer-executable instructions for performing the scanning processing for the document to obtain the scanned image-data by using the image-scanning device based on the scanning-processing condition, and the changed condition; and computer-executable instructions for performing image processing for the scanned image-data based on the image-processing condition and the changed condition, and outputting the output-image data, wherein computer-executable instructions for changing at least one of the scanning-processing condition and the image-processing condition includes computer-executable instructions for performing an advanced-condition setting to set an advanced item corresponding to the restricting item.

12. An image-processing system, comprising:

an image-scanning device configured to perform scanning processing by scanning an image on a document to obtain a scanned image-data;

an image-processing device configured to perform image processing for the scanned image-data and output as an output-image data;

a user interface; and a control device, wherein the control device is configured to, set a condition for performing the scanning processing and a condition for performing the image processing, select a restricting item with the user interface, wherein the restricting item is one of (1) a size of the output-image data subjected to the image processing, and (2) a time period from when the scanning processing is started to when the output-image data is output, change at least one of the scanning-processing condition and the image-processing condition based on the restricting item having a limit value, perform the scanning processing for the document to obtain the scanned image-data by using the image-scanning device based on the scanning-processing condition, and the changed condition, and perform image processing for the scanned image-data based on the image-processing condition and the changed condition, and outputting the output-image data, wherein change at least one of the scanning-processing condition and the image-processing condition includes perform an advanced-condition setting to set an advanced item corresponding to the restricting item.

* * * * *